(12) United States Patent
Burgess et al.

(10) Patent No.: US 9,289,688 B2
(45) Date of Patent: Mar. 22, 2016

(54) GAMES CONTROLLER

(71) Applicant: Ironburg Inventions Ltd., Wincanton, Somerset (GB)

(72) Inventors: Simon Burgess, Cossington (GB); Duncan Ironmonger, Atlanta, GA (US)

(*) Notice: Subject to any disclaimer, the term of this patent is extended or adjusted under 35 U.S.C. 154(b) by 0 days.

(21) Appl. No.: 14/832,211

(22) Filed: Aug. 21, 2015

(65) Prior Publication Data
US 2015/0360126 A1 Dec. 17, 2015

Related U.S. Application Data

(63) Continuation of application No. PCT/EP2015/058096, filed on Apr. 14, 2015.

(60) Provisional application No. 61/979,124, filed on Apr. 14, 2014.

(51) Int. Cl.
| A63F 13/06 | (2006.01) |
| A63F 13/24 | (2014.01) |
| A63F 13/20 | (2014.01) |
| A63F 13/218 | (2014.01) |

(52) U.S. Cl.
CPC ............... *A63F 13/24* (2014.09); *A63F 13/20* (2014.09); *A63F 13/218* (2014.09); *A63F 2300/10* (2013.01)

(58) Field of Classification Search
CPC ...................................................... A63F 13/06
See application file for complete search history.

(56) References Cited

U.S. PATENT DOCUMENTS

| 6,251,015 | B1 | 6/2001 | Caprai |
| 7,510,477 | B2 | 3/2009 | Argentar |
| 7,859,514 | B1* | 12/2010 | Park ...................... A63F 13/06 345/156 |
| 2001/0003713 | A1 | 6/2001 | Willner et al. |
| 2002/0052237 | A1 | 5/2002 | Magill |
| 2002/0128064 | A1 | 9/2002 | Sobota |
| 2003/0067111 | A1 | 4/2003 | Swan |
| 2004/0259059 | A1 | 12/2004 | Aoki |

(Continued)

FOREIGN PATENT DOCUMENTS

| EP | 2 479 636 | 7/2012 |
| EP | 2 698 185 | 2/2015 |

(Continued)

OTHER PUBLICATIONS

"Review: Scuf Xbox 360 Controller" by Dave Burns, published Oct. 20, 2010. Source https://www.xboxer360/features/review-scuf-xbox-360-controller/, 16 pages.*

(Continued)

*Primary Examiner* — Omkar Decodhar
(74) *Attorney, Agent, or Firm* — Walters & Wasylyna LLC

(57) ABSTRACT

An improved controller (10) for a games console that is intended to be held by a user in both hands in the same manner as a conventional controller (1). Additionally, the controller (10) may include the same controls (2, 3, 4, 5, 6, 7, 8, 9) as a conventional controller (1). The controller (10) is advantageous as it additionally comprises additional controls (11A, 11B, 11C, 11D) located on the rear of the controller (10) in a position to be operated by the middle fingers of a user (12). The additional controllers (11A, 11B, 11C, 11D) may be paddle levers and may replicate the functions of one or more of the controls (2, 3, 4, 5, 6, 7, 8, 9) located on the front or top of the controller (10).

30 Claims, 10 Drawing Sheets

(56) References Cited

U.S. PATENT DOCUMENTS

| | | | |
|---|---|---|---|
| 2005/0083297 A1 | 4/2005 | Duncan | |
| 2005/0255918 A1* | 11/2005 | Riggs | A47C 3/16 463/37 |
| 2009/0088250 A1 | 4/2009 | Carlson | |
| 2009/0258705 A1 | 10/2009 | Guinchard | |
| 2010/0304865 A1 | 12/2010 | Picunko | |
| 2011/0256930 A1 | 10/2011 | Jaouen | |
| 2011/0281649 A1 | 11/2011 | Jaouen | |
| 2012/0322553 A1 | 12/2012 | Burgess et al. | |
| 2014/0274397 A1 | 9/2014 | Sebastian | |
| 2015/0238855 A1* | 8/2015 | Uy | A63F 13/24 463/37 |

FOREIGN PATENT DOCUMENTS

| | | |
|---|---|---|
| GB | 2 244 546 | 12/1991 |
| GB | 2 481 633 | 1/2012 |
| WO | WO 2008/131249 | 10/2008 |

OTHER PUBLICATIONS

International Search Report, PCT/EP2014/060587 (2014).
International Search Report, PCT/EP2015/058096 (2015).
Written Opinion of the International Searching Authority, PCT/EP2015/058096 (2015).
Burns, "Review: Scuf Xbox 360 Controller," Xboxer360.com (2010).
Combined Search and Examination Report, GB1011078.1 (2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/736,771 (2015).
Office Action, U.S. Appl. No. 14/805,597 (2015).
Office Action, U.S. Appl. No. 14/805,641 (2015).
Office Action, U.S. Appl. No. 14/805,661 (2015).

\* cited by examiner

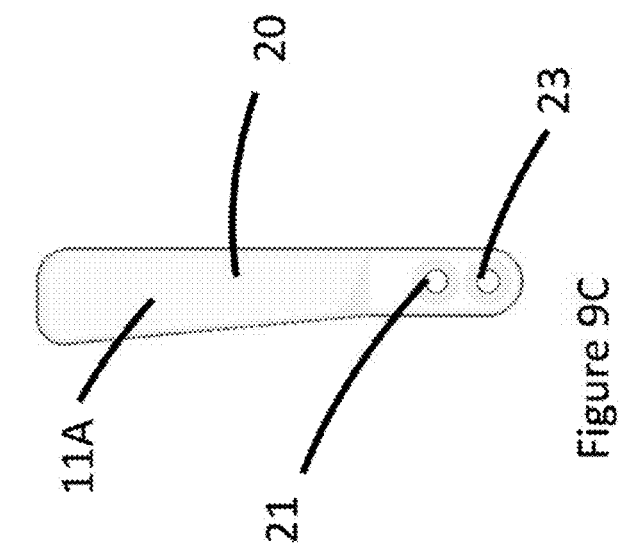
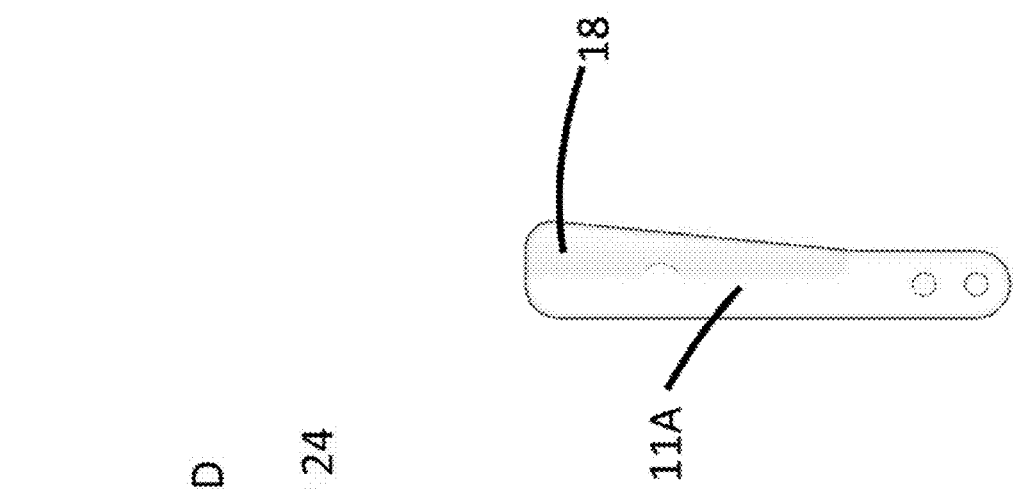
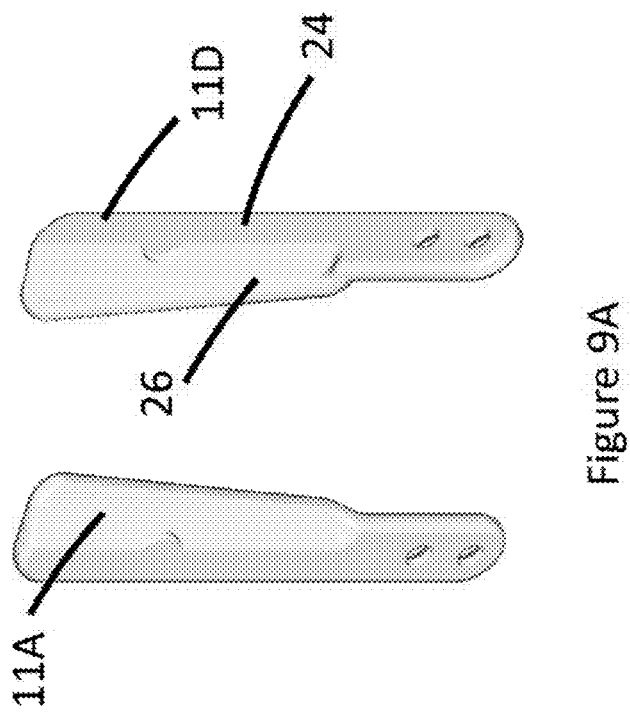
Figure 9A
Figure 9B
Figure 9C

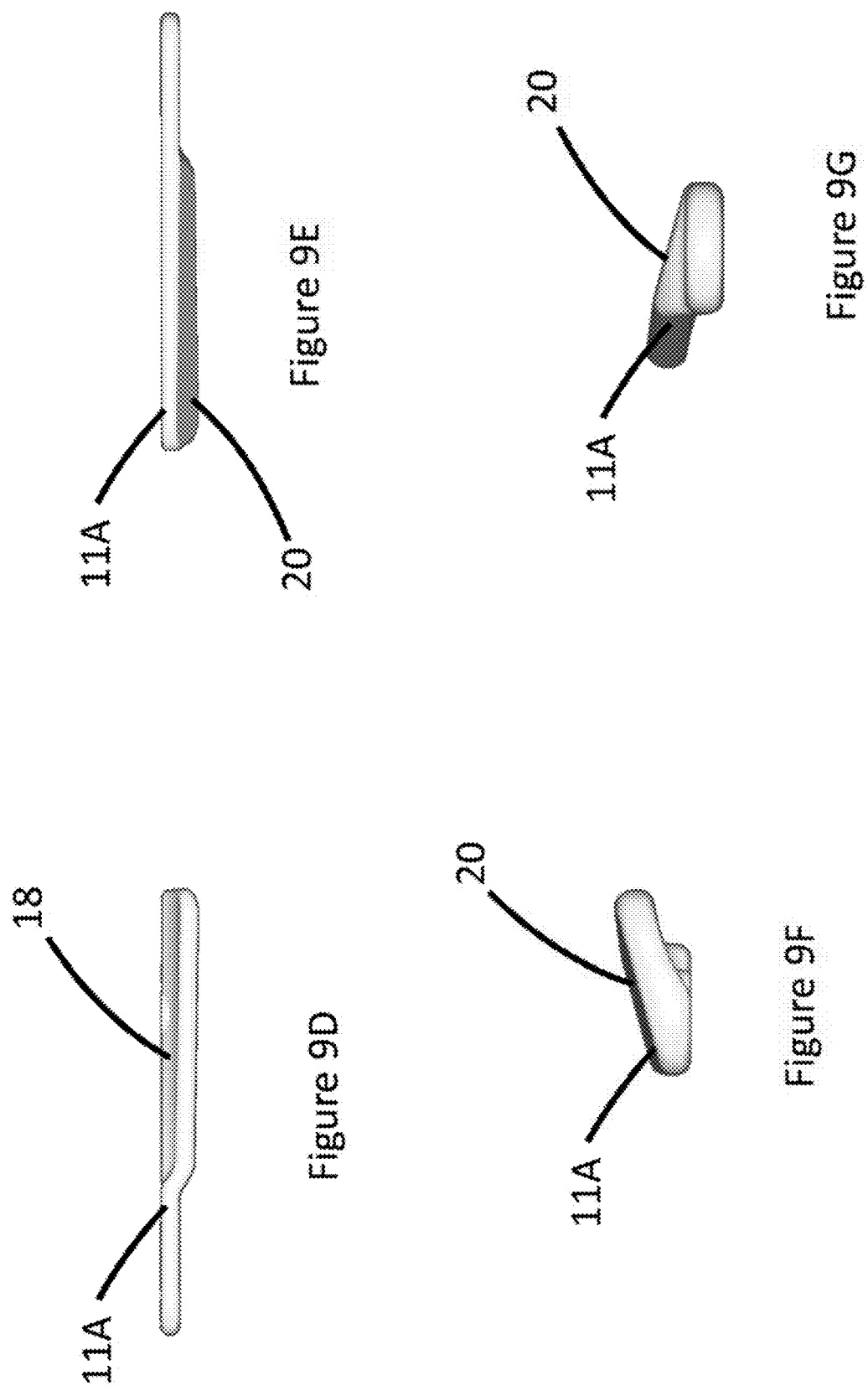

GAMES CONTROLLER

PRIORITY

This application is a continuation of Intl. App. No. PCT/EP2015/058096 filed on Apr. 14, 2015, which claims priority from U.S. Ser. No. 61/979,124 filed on Apr. 14, 2014. The entire contents of PCT/EP2015/058096 and 61/979,124 are incorporated herein by reference.

FIELD

The invention relates to controllers for controlling the play of computerized games; more particularly, but not exclusively, the invention relates to an actuator system of a game controller for a gaming console.

BACKGROUND

There are many different types of gaming consoles currently available for operating a video game. For example, Microsoft®, Sony® and Nintendo® manufacture the Xbox®, PlayStation® and Wii® gaming consoles, respectively. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically, the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button, actuator, or other control on the front and top of the controller. Controls mounted on the front of the controller are intended to be operable by the index fingers of a user; such buttons are commonly known as triggers or bumpers. Controls mounted on the top of the controller are intended to be operable by the thumbs of a user; such controls may include left and right analogue thumb sticks, which normally control movement and are intended to be operated by the user's left and right thumbs respectively. There may be additional buttons located on a front right portion of the top of the controller, which normally control additional actions and are intended to be operated by the user's right thumb. There may be provided a direction pad located on the rear left portion of the top of the controller. The direction pad is intended to be operated by the user's left thumb, typically either as an alternative to the left thumb stick or to provide additional actions. The controllers typically have a pair of handles or grip portions to enable a user to hold the controller; typically, the user will employ the middle, ring and/or little finger of each hand to grasp a respective handle.

Due to the rapidly expanding gaming market and development of involved games invoking considerable player input, it is desirable for players to be able to customize their controllers in order to gain increased control in a variety of gaming circumstances.

The present invention seeks to improve upon, or at least mitigate, some of the problems associated with controllers of the prior art by providing a game controller which includes additional actuators on the bottom of the controller, which allow a user to employ the middle, ring or little finger of the hand for operation of control of the functions of a video game.

SUMMARY

A first aspect of the present invention provides an apparatus for supplying user inputs to a computer program, such as a game program, for controlling the game program, comprising:
a case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller; wherein
the controller further comprises at least one first additional control located on a back of the controller in a position operable by a middle, ring or little finger of a user, the at least one additional control comprising a first elongate member which is inherently resilient and flexible such that it can be sufficiently displaced by a user to activate a control function, wherein the or each first elongate member comprises a first surface disposed proximate an outer surface of the controller and the or each first elongate member comprises a second surface opposing said first surface, the second surface being configured and arranged to be non-parallel with a portion of the outer surface of the back of the controller to which said first elongate member is mounted.

Optionally, the second surface of the or each first elongate member is configured and arranged to be non-parallel with the first surface of said first elongate member.

Optionally, at least a portion of the or each first elongate member is configured and arranged to have a substantially triangular cross section.

Optionally, the controller further comprises at least one second additional control located on the back of the controller in a position operable by a middle, ring or little finger of a user, the at least one second additional control comprising a second elongate member which is inherently resilient and flexible such that it can be sufficiently displaced by a user to activate a control function, wherein the at least one second additional control is disposed adjacent to the at least one first additional control, wherein the second surface of the first elongate member of the at least one first additional control is configured and arranged to direct a user's finger towards the second elongate member disposed adjacent thereto.

Optionally, the or each second elongate member comprises a first surface disposed proximate an outer surface of the controller and the or each second elongate member comprises a second surface opposing said first surface, the second surface of the first elongate member being configured and arranged to be non-parallel with the second surface of said second elongate member.

Optionally, the or each first elongate member is disposed outermost.

Optionally, the or each first elongate member is disposed in closer proximity to a handle than a respective adjacent second elongate member.

Optionally, the or each first elongate member comprises a first side edge and a second side edge opposing the first side edge, the first side edge being disposed in closer proximity to a respective adjacent second elongate member than the second side edge, and the second side edge being disposed in closer proximity to a respective adjacent handle than the first side edge, and wherein the first side edge is disposed in closer proximity to a portion of the outer surface of the back of the controller to which the first elongate member is mounted than the second side edge.

Optionally, the apparatus is a hand held controller for a games console and comprises a hard outer case wherein the or each elongate member is at least partially disposed in a respective channel formed in a rear surface of the controller.

Optionally, the or each elongate member is at least partially disposed in a respective channel formed in a rear surface of the controller, the channel being configured and arranged to form a close fit to at least a portion of the elongate member so as to provide lateral support thereto.

Optionally, the or each elongate member comprises a first dimension and the controller comprises a cover portion forming a conduit enclosing the elongate member within the respective channel along a portion of the first dimension of the elongate member.

Optionally, the or each elongate member comprises a longitudinal dimension and the controller comprises a cover portion forming a conduit enclosing the elongate member within the respective channel along a portion of the longitudinal dimension of the elongate member.

Optionally, the or each elongate member comprises a first part of a complementary locking mechanism.

Optionally, the or each conduit comprises a second part of a complementary locking mechanism.

Optionally, the first or second part of a complementary locking mechanism comprises a catch or barb which is displaceable so as to release the elongate member from the conduit.

Optionally, the first or second part of a complementary locking mechanism comprises an aperture or recess having an engaging edge.

Optionally, the or each elongate member is formed from material having a thickness less than 10 mm.

Optionally, the or each elongate member is formed from material having a thickness less than 5 mm.

Optionally, the or each elongate member is formed from material having a thickness between 1 mm and 3 mm.

Optionally, the or each of the elongate members are parallel with respect to one another.

Optionally, the or each of the elongate members converge towards the front end of the controller with respect to one another.

Optionally, a portion of the or each elongate member is in registry with a switch mechanism disposed within the controller, such that displacement of the elongate member activates the switch mechanism.

Optionally, a switch mechanism is disposed between the or each elongate member and an outer surface of the base of the controller.

Optionally, a switch mechanism is mounted to a rear panel of the controller wherein the switch mechanism comprises an engaging surface, the engaging surface being disposed in an aperture in an outer surface of the rear panel and arranged flush with an outer surface of the rear panel.

Optionally, a switch mechanism is mounted to a rear panel of the controller wherein the switch mechanism comprises an engaging surface, the engaging surface being recessed within an aperture defined in an outer surface of the rear panel.

Optionally, the additional controls are paddle levers.

Optionally, the additional controls are substantially vertically orientated with respect to the controller.

Optionally, the additional controls are formed separately from the outer case of the controller.

Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 9A is a perspective view from below of the actuators of the games controller of FIG. 1;

FIG. 9B is a plan view from below of one of the actuators of the games controller of FIG. 9A;

FIG. 9C is a plan view from above of the actuator of FIG. 9B;

FIG. 9D is a first side view of the actuator of FIG. 9B;

FIG. 9E is a second side view of the actuator of FIG. 9B;

FIG. 9F is a first end view of the actuator of FIG. 9B; and

FIG. 9G is a second end view of the actuator of FIG. 9B.

DETAILED DESCRIPTION

Detailed descriptions of specific embodiments of game controllers and actuators are disclosed herein. It will be understood that the disclosed embodiments are merely examples of the way in which certain aspects of the invention can be implemented and do not represent an exhaustive list of all of the ways the invention may be embodied. Indeed, it will be understood that the game controllers and actuators described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
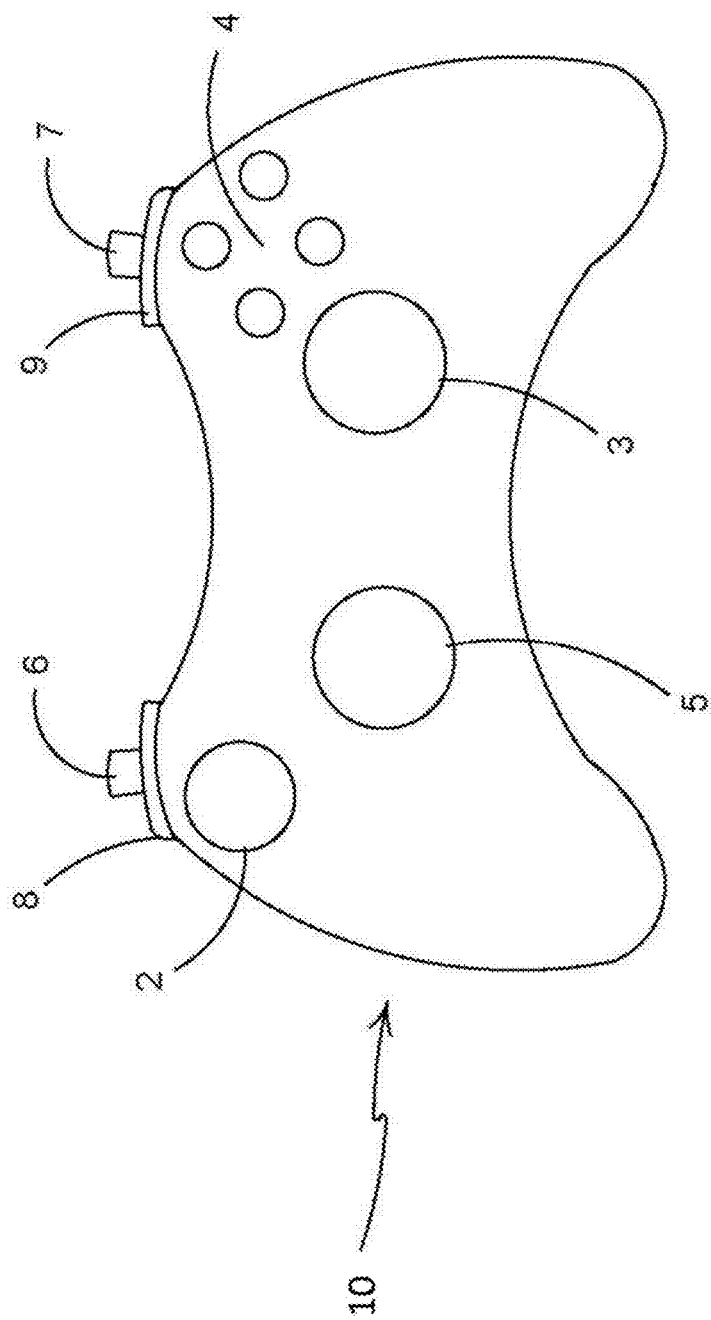
FIG. 1 is a schematic illustration of the top of a games console controller according to one embodiment.

Referring to FIG. 1, there is shown a controller 10 according to an embodiment of the invention. The controller 10 comprises a mechanism for adjusting trigger travel motion; both the start position and the end position of the trigger movement are adjusted by the mechanism.

The controller 10 comprises an arrangement of game controls that are mounted on the front and top of the controller 10. The controller 10 comprises a left analogue thumb stick 2 and a right analogue thumb stick 3. The left analogue thumb stick 2 and the right analogue thumb stick 3 normally control movement actions and are intended to be operated by the user's left and right thumbs respectively. The controller 10 comprises four buttons 4, located on a front right portion of the controller 10, which normally control additional in-game actions and that are intended to be operated by the user's right thumb. The controller 10 comprises a direction pad 5 located on the lower portion of the front left of the controller 10. The direction pad 5 is intended to be operated by the user's left thumb, and typically is used either as an alternative to the left thumb stick 2, or to provide additional actions. The controller 10 also comprises a left trigger body 6, a right trigger body 7, a left bumper 8 and a right bumper 9 located on the front edge of the controller 10. The left and right trigger bodies 6, 7 are typically operated by a user's index fingers or forefingers. The left and right bumpers 8, 9 may also be operated by a user's index fingers or forefingers. It will be understood that the arrangement of game controls illustrated in respect of the present embodiment is optional and may vary in other game controllers embodying the present invention, which may be applied to a variety of actuators as described below.

Figure 2:
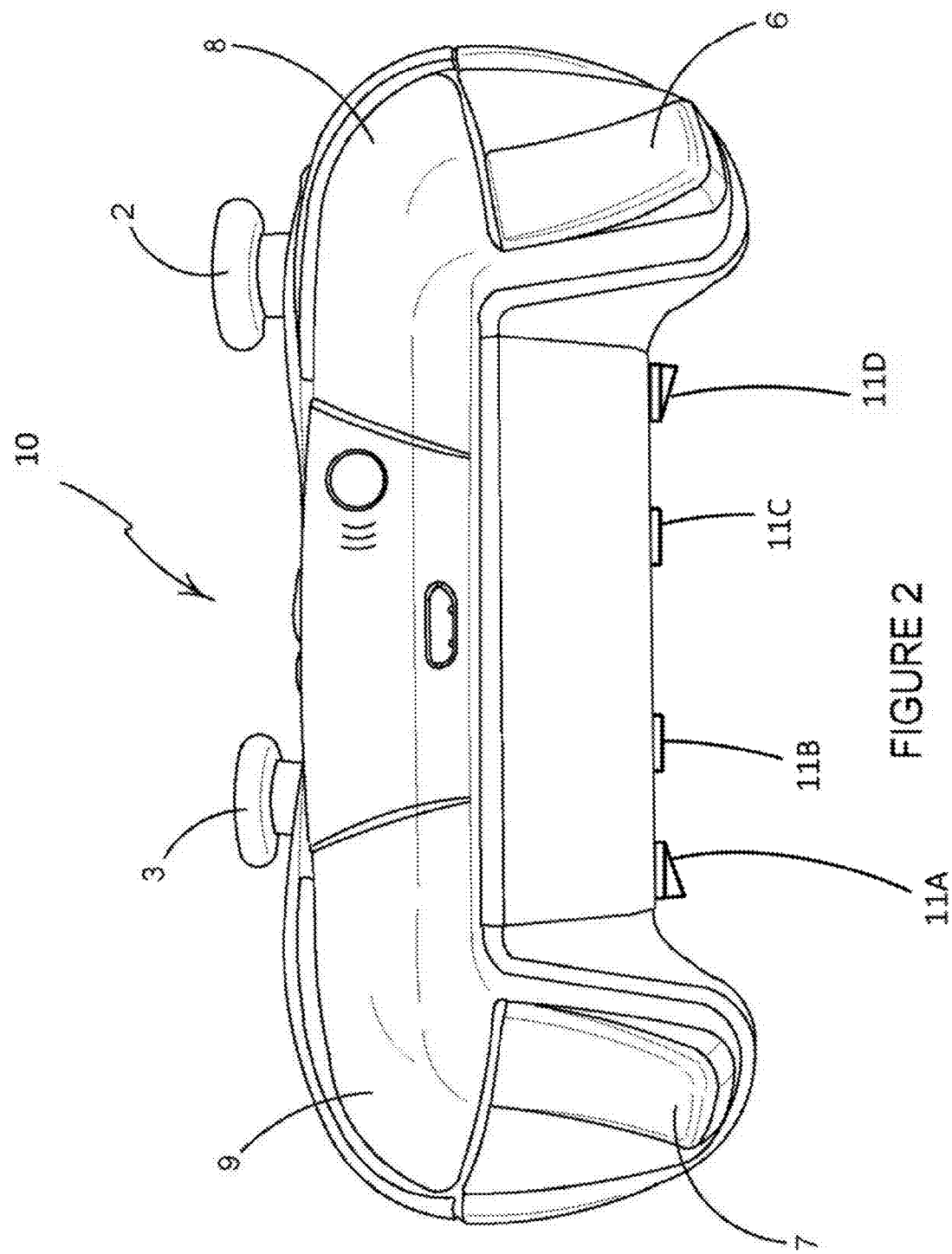
FIG. 2 is a front view of the games console controller of FIG. 1.

FIG. 2 illustrates a front view of the controller 10 of FIG. 1. It can be seen that the left trigger body 6 is mounted below the left bumper 8 and the right trigger body 7 is mounted below the right bumper 9.

The only way to operate the four buttons 4 is for a user to remove their right thumb from the right thumb stick 3. This takes time and, in some games, can cause the loss of control. This is a particular problem in games where the right thumb stick 3 is used for aiming. A similar problem may arise in games where the direction pad 5 provides additional actions and the user has to remove their thumb from the left thumb stick 2 in order to operate the direction pad 5.

In light of the above, there is a need for an improved controller which removes the requirement for a user to remove their thumbs from the left or right thumb stick 2, 3 in order to operate additional actions controlled by the four buttons 4 and/or the direction pad 5.

Figure 3:
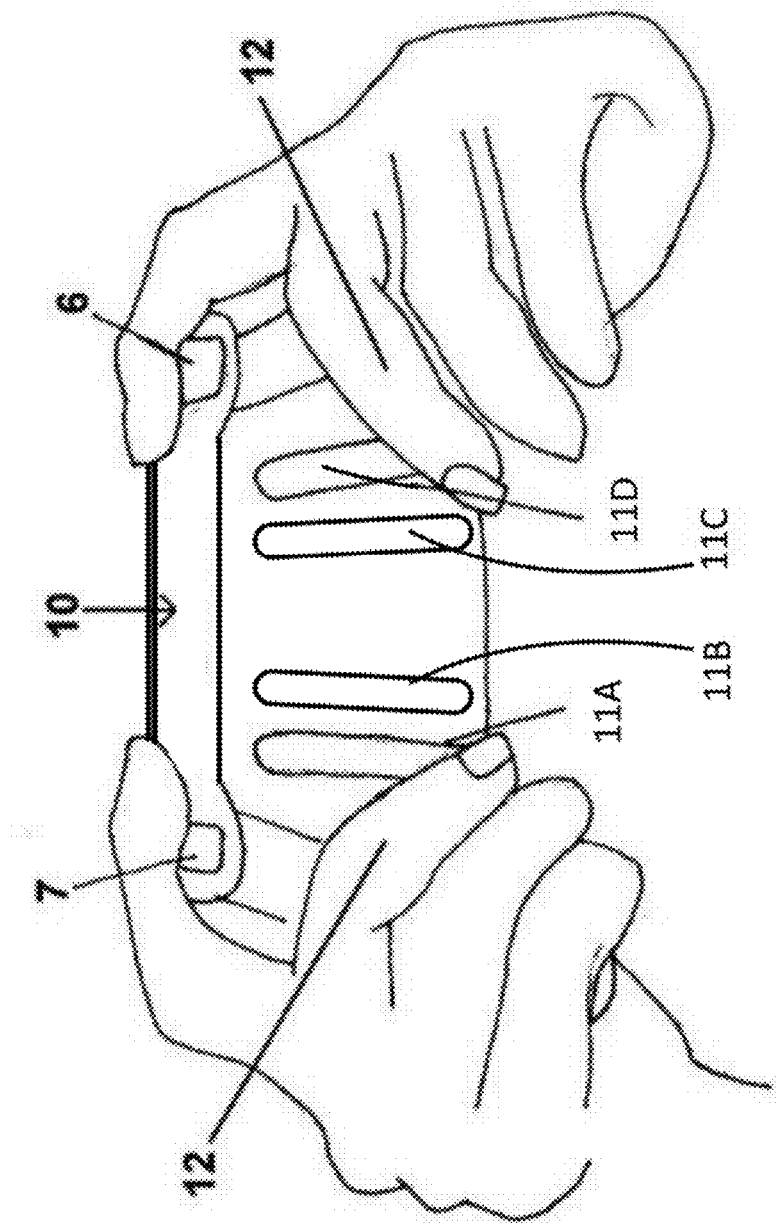
FIG. 3 is a schematic illustration from below of the rear panel of the games controller of FIG. 1 showing a user's hands.

The rear of the games controller 10 is illustrated in FIGS. 3 to 8. The controller 10 comprises four paddle levers 11A, 11B, 11C, 11D located on the rear of the controller. The paddle levers 11A, 11B are substantially orientated in parallel with respect to a first handle portion H1 of the controller 10 and are positioned to be operated by the middle, ring or little fingers of a user 12, as shown in FIG. 3. The paddle levers 11C, 11D are substantially orientated in parallel with respect to a second handle portion H2 of the controller 10 and are positioned to be operated by the middle, ring or little fingers of a user 12, as shown in FIG. 3.

In one embodiment the paddles 11A, 11B, 11C, 11D are formed from a thin, flexible material such as a plastics material, for example polyethylene. Optionally, the paddles 11A, 11B, 11C, 11D are less than 10 mm thick, but may be less than 5 mm thick.

The paddles 11A, 11B, 11C, 11D are inherently resilient, that is to say that they return to an unbiased position when not under load. A user may displace or depress any one of the paddles 11A, 11B, 11C, 11D by engaging an outer surface thereof; such displacement causes the actuated paddle 11A, 11B, 11C, 11D to activate a switch mechanism (not shown) mounted in vertical registry with a portion of each paddle within the body of the controller 10. A portion of the switch mechanism may extend through the controller body and be disposed in close proximity to, or in contact with, an innermost surface of the paddles 11A, 11B, 11C, 11D.

The paddles 11A, 11B, 11C, 11D are mounted between the first handle portion H1 and the second handle portion H2 located on the base of the controller 10, and are disposed in close proximity to the outer surface of the controller body.

It is envisaged that the paddles 11A, 11B, 11C, 11D could be fitted to an existing controller 10. In such embodiments, the paddles would be mounted onto an outer surface of the controller body. In the illustrated embodiment, the paddles are fixed by a screw mechanism. A screw 15, having an external screw thread, is received in each of a pair of apertures provided in each of the paddles 11A, 11B, 11C, 11D. The apertures for receiving the screws 15 are provided at one end of the paddles 11A, 11B, 11C, 11D; this is a fixed end. The other end of the paddles 11A, 11B, 11C, 11D is moveable. In this way, the paddles 11A, 11B, 11C, 11D can be bent or deformed temporarily. The inherent resilience of the paddles 11A, 11B, 11C, 11D returns the paddles 11A, 11B, 11C, 11D substantially to their starting position when released, and allows the switch mechanism to do the same. The screws 15 are received in the base of the controller 10 in a respective aperture having an internal screw thread. It is envisaged that the internal screw thread may be pre-tapped into the base portion of the controller body, or may be created when driving the screws 15 into the base portion of the controller body, for example by using a self-tapping screw 15. It is also envisaged that the internal screw thread may be provided directly in the material forming the base portion of the controller body or may be provided in a separate insert or nut secured to, or in, the controller body. In alternative embodiments other fixing means are envisaged, for example the paddles 11A, 11B, 11C, 11D may be bonded or adhesively secured to the controller body; in other embodiments the paddles 11A, 11B, 11C, 11D may comprise an integrally formed clip or locking device such as a detent or barb for being engaged with a receiver located on the controller body. In still further embodiments, the paddles 11A, 11B, 11C, 11D may be integrally formed with a cover panel or portion of the rear panel of the controller such as, but not limited to, a battery hatch.

Figure 4:
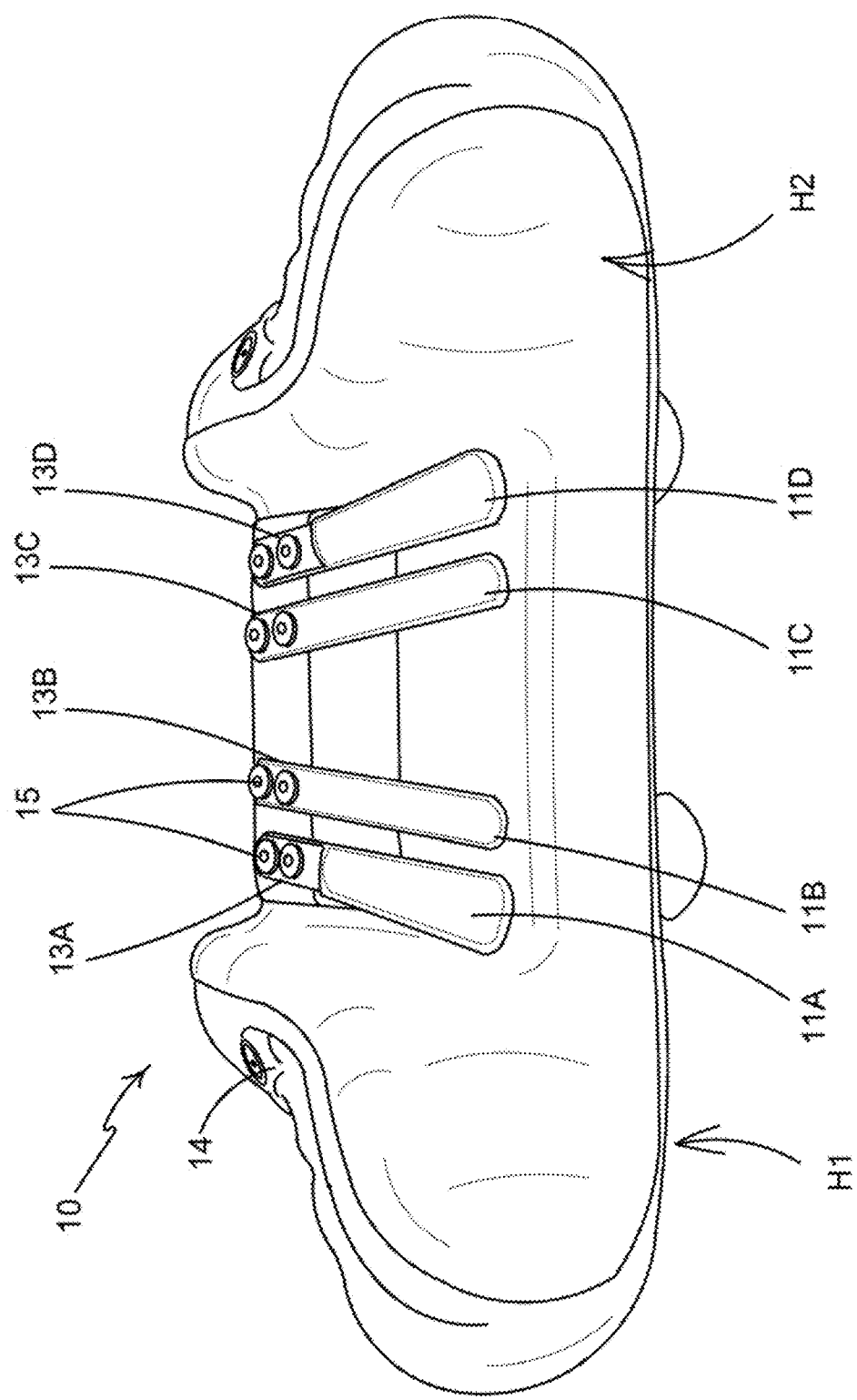
FIG. 4 is a perspective view from below of the rear panel of the games controller of FIG. 1.
Figure 5:
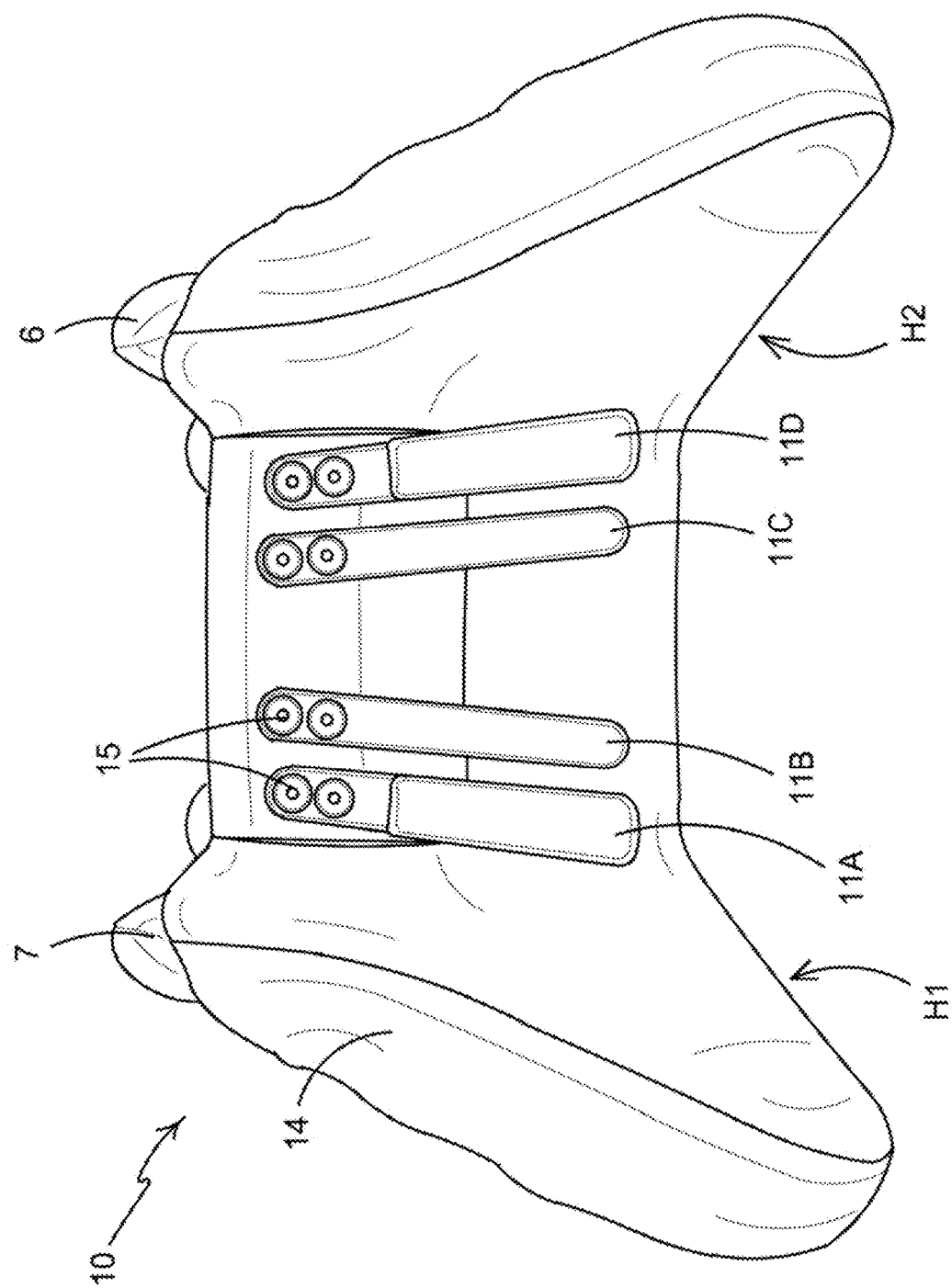
FIG. 5 is a plan view from below of the rear panel of the games controller of FIG. 1.
Figure 6:
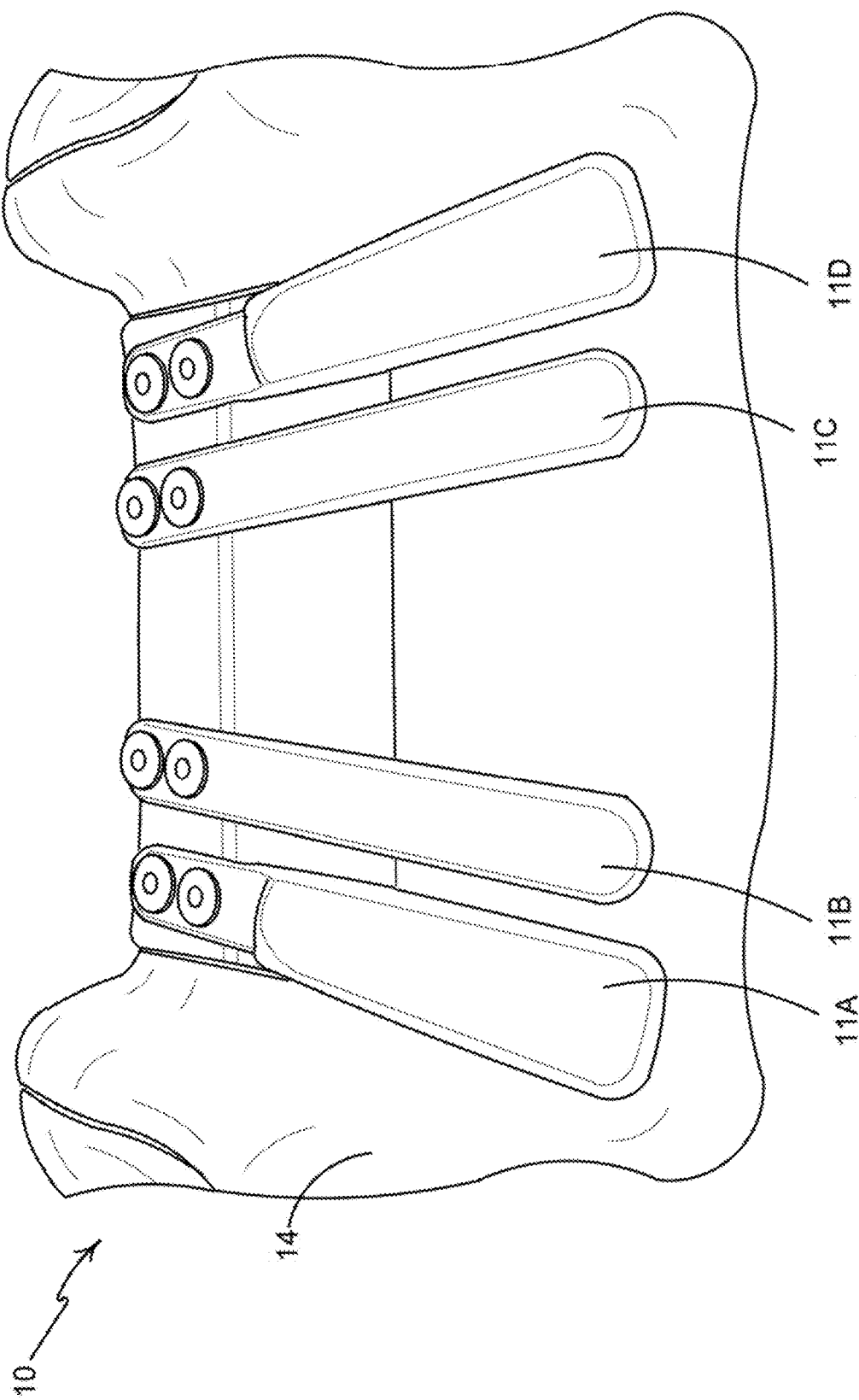
FIG. 6 is an enlarged perspective view of additional actuators mounted to the rear panel of the games console controller of FIG. 1.

Optionally, the base of the controller 10 is provided with four channels 13A, 13B, 13C, 13D, best shown in FIG. 4. Each channel 13A, 13B, 13C, 13D receives a respective one of the paddles 11A, 11B, 11C, 11D. In the illustrated embodiment the channels 13A, 13B, 13C, 13D are arranged to receive an end portion of the respective paddle 11A, 11B, 11C, 11D. This is achieved by reducing the depth of the channels 13A, 13B, 13C, 13D towards one end to nothing, such that the channels 13A, 13B, 13C, 13D are tapered. This provides that one end of each of the paddles 11A, 11B, 11C, 11D stands proud of the base of the controller 10, best shown in FIG. 6. In this way, a user can readily engage with the paddles 11A, 11B, 11C, 11D. The channels 13A, 13B, 13C, 13D provide stability to the paddles 11A, 11B, 11C, 11D. This increases the durability of the paddles and of the fixing means.

The channels 13A, 13B, 13C, 13D reduce the likelihood of the paddles 11A, 11B, 11C, 11D rotating about the fixing end when engaging with the moveable end. The channels serve to restrict movement of the paddles 11A, 11B, 11C, 11D in a direction substantially perpendicular to the base of the controller as indicated by direction arrow D1 in FIG. 7.

In this way, a user may engage the paddles 11A, 11B, 11C, 11D with the tips of the fingers, optionally the middle fingers, without compromising the user's grip on the controller 10. However, it is envisaged that a user could use the ring or little finger. The index fingers may simultaneously engage trigger style controls mounted on the forward end of the controller 10 whilst the thumbs may be used to activate controls on the top of the controller 10.

The paddles 11A, 11B, 11C, 11D are elongate in shape and substantially extend in a direction from the front to the rear of the controller 10. In one embodiment, the pair of paddles 11A, 11B are orientated such that they converge towards the forward end with respect to the pair of paddles 11C, 11D; the pair of paddles 11A, 11B are orientated parallel with respect to one another, and the pair of paddles 11C, 11D are orientated parallel with respect to one another. In an alternative embodiment, the paddles 11A, 11B, 11C, 11D are orientated parallel with respect to one another. The elongate shape of the paddles allows a user to engage the paddles with any of the middle, ring or little fingers; it also provides that different users, having different sized hands, can engage with the paddles in a comfortable position.

Each of the four paddle levers 11A, 11B, 11C, 11D can replicate the function of one of the four buttons 4 located on the front of the controller 10, and thereby allow a user to operate the functions of the relevant buttons using their middle fingers 12, without the need to remove either of their thumbs from the left or right thumb stick 2, 3. In alternative embodiments, the paddle levers 11A, 11B, 11C, 11D may activate a new function not activated by the controls on the top of the controller 10.

Figure 7:
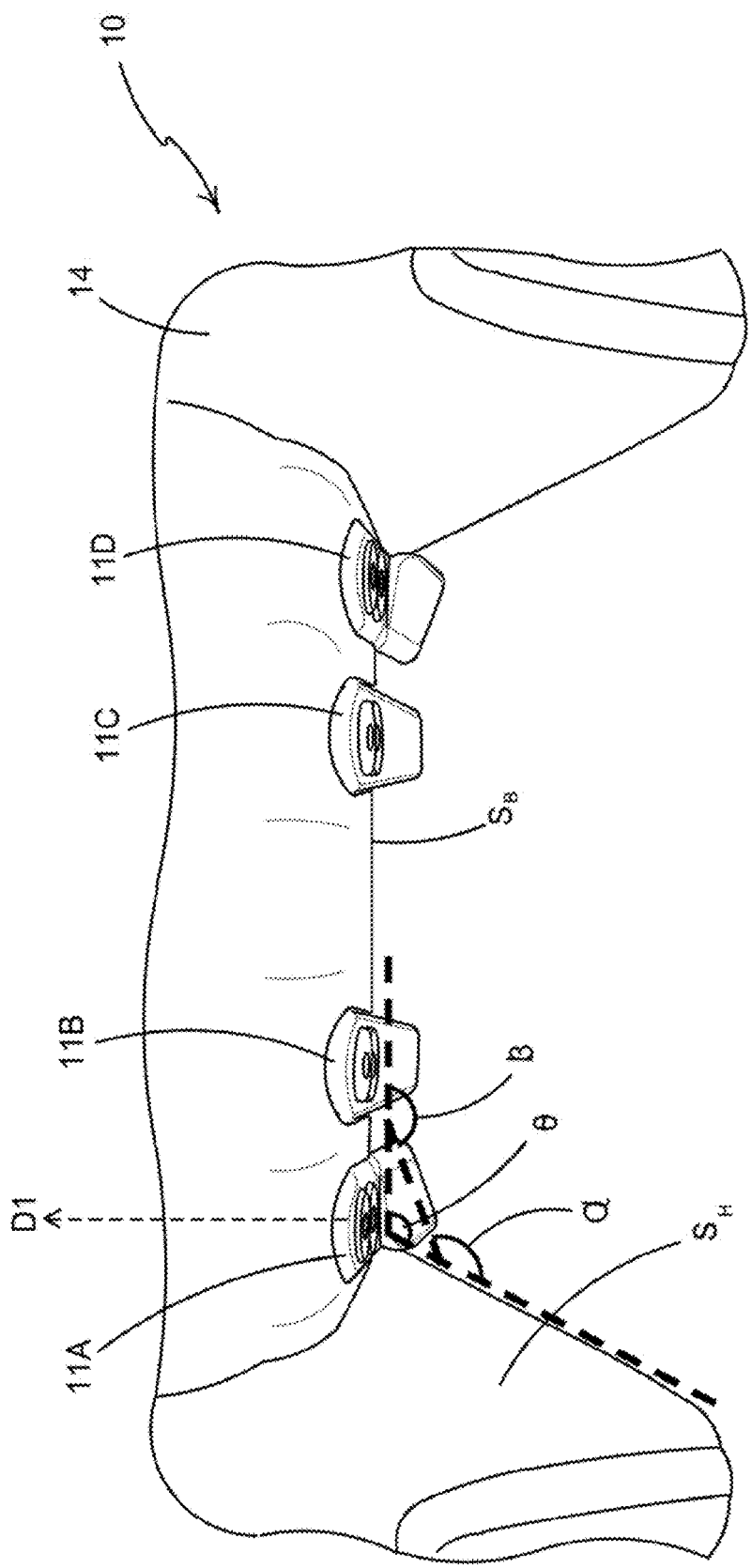
FIG. 7 is an enlarged front view of the games controller of FIG. 1 showing the relationship between the paddles and the rear panel and handles.
Figure 8:
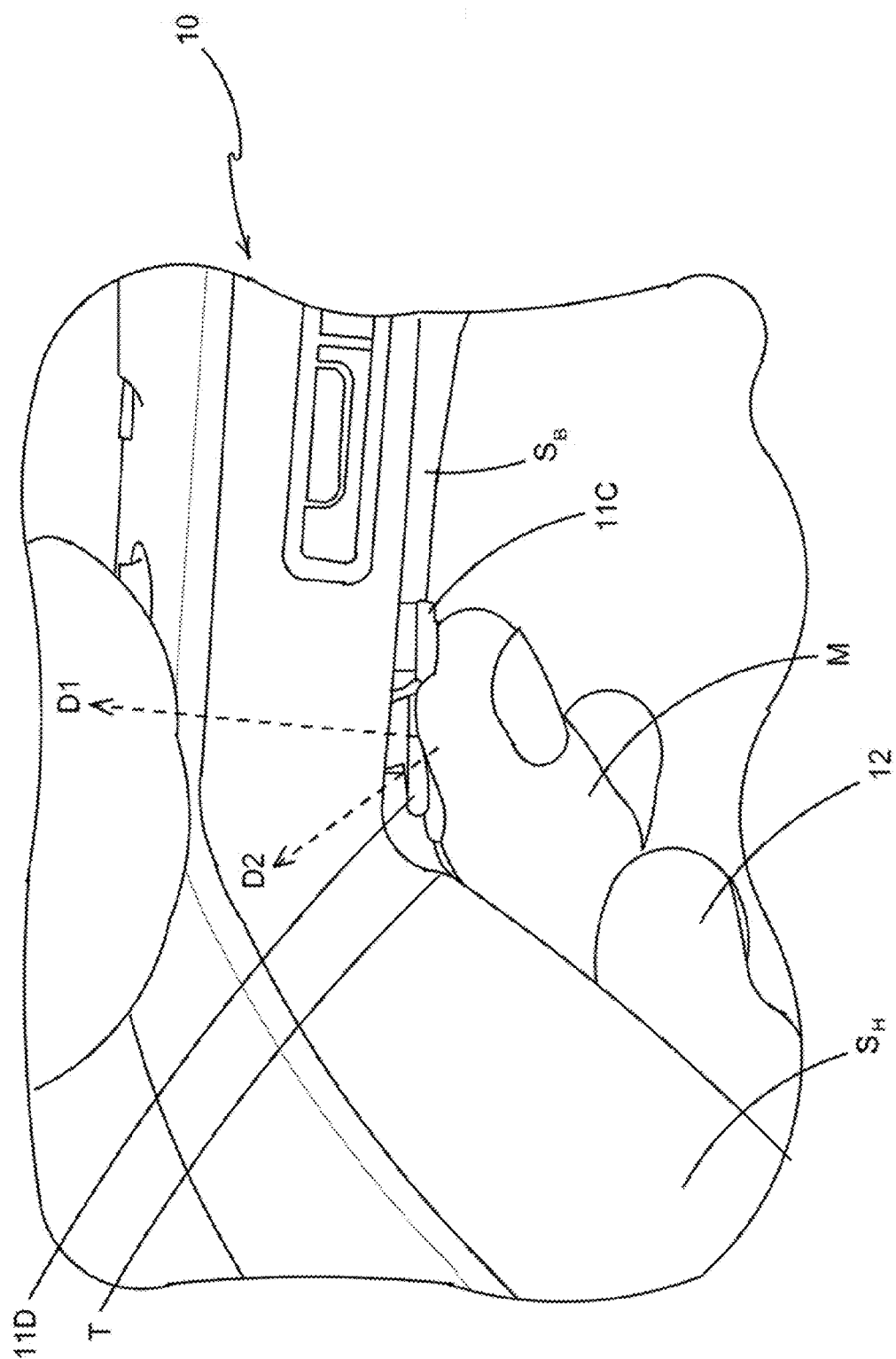
FIG. 8 is an enlarged rear view of the games console controller of FIG. 1 showing the paddles in use by a user.

The handles H1, H2 comprise an inner surface $S_H$, best shown in FIGS. 7 and 8. The inner surface $S_H$ is engaged by the middle, ring and little fingers of a user's hands. The ring and little fingers are increasingly important for grip of the controller when the middle fingers are employed actuating the paddles 11A, 11B, 11C, 11D. The inner surface $S_H$ of each the handles H1, H2 meets an inner surface $S_B$ of a region of the base of the controller 10 upon which the paddles 11A, 11B, 11C, 11D are mounted. The inner surface $S_H$ is inclined at a steep angle θ (best shown in FIG. 7) with respect to the inner surface $S_B$ of the controller base. This angle is equal to or greater than 45 degrees; optionally it may be between about 50 degrees to about 60 degrees. The handles H1, H2 have a substantially flat upper portion T. The flat portion meets the inner surface $S_B$ to define an internal corner or edge; the corner or edge is sharp, that is to say the corner or edge has a small radius of curvature. In this way, the handles H1, H2 provide an ergonomic shape for being grasped by the ring and little fingers of a user's hands.

The outermost paddles 11A, 11D are shaped such that when a user 12 engages with a respective one of the outermost paddles 11A, 11D their engaging finger, that is to say the finger or fingers they use to interact with said respective one of the outermost paddles 11A, 11D, is directed towards the respective adjacent paddle 11B, 11C. In this way, the user 12 can readily find the adjacent paddle 11B, 11C. The user 12 need not disengage or lift off the outermost paddle 11A, 11D but maintain touching contact therewith whilst actuating one of the inner paddles 11B, 11C. It is envisaged that the user will not depress (so as to actuate the switch mechanism) both of an outermost paddle 11A, 11D and an adjacent neighbor simultaneously but will actuate the paddles independently. However, it will be appreciated that simultaneous actuation of the outermost paddle 11A, 11B and its adjacent neighbor 11B, 11C is facilitated by the shape and/or orientation of the lowermost surface of the outermost paddles 11A, 11D.

FIG. 8 illustrates a user 12 holding a controller 10. The user's finger M, in this illustration a middle finger of the left hand, is in touching contact with both the paddle 11D and the paddle 11C. The user 12 engages the paddle 11C with the fingertip or end and engages the paddle 11D with the finger pad (the region opposing the finger nail). It will be appreciated that the user may engage the paddles 11D, 11C in a similar manner with the ring or little finger of the left hand. It will be appreciated that the user may engage the paddles 11A, 11B in a similar manner with the middle, ring or little finger of the right hand.

As illustrated in FIG. 7 the lower surface of the paddles 11A, 11D are orientated so as to define an angle α with respect to the surface $S_H$ and to define an angle β with respect to the surface $S_B$. The angle α is larger than the angle θ, and the angle β is larger than the angle θ.

The alignment of the lower surface of the outermost paddles 11A, 11D also reduces the likelihood of a user's finger M slipping off the outermost paddle 11D with which it is engaged. This is especially useful since the finger M may also be being employed by the user to grasp or support the controller 10.

In addition, the paddles 11A, 11D provide a tactile recognition device. The user will be able to readily recognize which of the paddles 11A, 11B, 11C, 11D the finger M is engaging by the feel of the paddle 11A, 11B, 11C, 11D.

The alignment of the lower surface of the outermost paddles 11A, 11D also allows a user to squeeze the outermost paddle 11A, 11D. That is to say, the user can flex or bend the finger M to actuate the outermost paddle 11A, 11D. This may facilitate a user to maintain a firm grasp of the controller 10 since the finger M is acting to grasp the handle H1, H2 tighter. The shape of the outer paddles 11A, 11D in effect directs a portion of the force received from flexing of the finger M onto the switch mechanism so as to actuate the switch mechanism. The direction of actuation of the switch mechanism is indicated by direction arrow D1 in FIGS. 7 and 8. The direction of movement of the end of the finger M is substantially in the direction of direction arrow D2, albeit the finger M will pivot about the joints of the finger.

FIGS. 9A to 9G illustrate the outermost paddles 11A, 11D. FIG. 9A shows a perspective view of the paddles 11A and 11D from below. The paddles 11A, 11D each comprise a pair of apertures 21, 23 disposed substantially at a first end thereof for fixing the paddles 11A, 11D to the controller 10. As shown in FIGS. 9B and 9D the paddle 11a comprises a lower surface 18. The paddle 11a comprises an upper surface 20 as shown in FIGS. 9E, 9F and 9G. At least a portion of the lower surface 18 is shaped and configured to be mounted in close proximity to an outer surface of the controller body 14.

The upper surface 20 is shaped and arranged to be disposed at an angle to the mounting portion of the lower surface 18. It will be appreciated that this can be achieved by shaping at least a portion of the paddle 11a so as to have a substantially triangular cross section. In other embodiments, the paddle can be formed with a twist or helical shape such that the upper surface is at least in part orientated at a non-zero angle with respect to the mounting portion of the lower surface 18.

In the illustrated embodiment the lower surface 18 of each of the paddles 11A, 11D comprises a first portion 24 and a second portion 26. The second portion 26 is orientated at a non-zero angle to the first portion 24; this is best illustrated in FIG. 9A. The first portion 24 forms a mounting surface.

An end portion of the paddles 11A, 11D comprising apertures 21, 23 is uniplanar on the lower surface 18. The upper surface 20 of this end portion is substantially parallel to the portion of the lower surface 18 disposed in vertical registry therewith. In this way, the screws or other fixing means act perpendicularly to hold the paddle 11A, 11D against the controller body 14.

Optionally, the paddles are tapered along their longitudinal axis, such that the paddles 11A, 11D are thinner towards a second end, the second end opposing the first end. In this way the upper surface 20 can be inclined in two directions; the paddle is banked towards the adjacent paddle 11B, 11C and ramped so as to rise upwardly towards the front of the controller. This may be advantageous for allowing a single paddle to be comfortably engaged by a plurality of different users so as to accommodate a variety of hand sizes. For example, a user with smaller hands may find it more comfortable to engage paddles 11A, 11D closer to the front of the controller 10, whereas a user with larger hands may be more inclined to employ the tail of the paddle 11A, 11D towards the rear of the controller 10.

It is envisaged that the controllers may be coupled to a games console or computer by a wired connection or by a wireless connection device.

It will be recognized that as used herein, directional references such as "top", "bottom", "front", "back", "end", "side", "inner", "outer", "upper" and "lower" do not limit the respective features to such orientation, but merely serve to distinguish these features from one another.

What is claimed is:

1. A games controller comprising:
    a case; and
    a plurality of controls located on a front end and a top of the case;
    the case being shaped to be held in both hands of a user such that the user's thumbs are positioned to operate controls located on the top of the case and the user's index fingers are positioned to operate controls located on the front end of the case; wherein
    the games controller further comprises at least one first additional control located on a back of the case in a position operable by a middle, ring or little finger of the user, the first additional control comprising a first elongate member displaceable by the user to activate a control function, wherein the first elongate member comprises a first surface disposed proximate an outer surface of the case and the first elongate member comprises a second surface opposing the first surface, the second surface being configured and arranged to be non-parallel with a portion of the outer surface of the back of the case to which the first elongate member is mounted.

2. The games controller of claim 1 wherein the second surface of the first elongate member is configured and arranged to be non-parallel with the first surface of said first elongate member.

3. The games controller of claim 1 wherein at least a portion of the first elongate member is configured and arranged to have a substantially triangular cross section.

4. The games controller of claim 1 further comprising at least one second additional control located on the back of the controller in a position operable by a middle, ring or little finger of the user, the second additional control comprising a second elongate member which is inherently resilient and flexible such that it can be sufficiently displaced by the user to activate a control function, wherein the second additional control is disposed adjacent to the at least one first additional control, wherein the second surface of the first additional control is configured and arranged to direct the user's finger towards the second elongate member disposed adjacent thereto.

5. The games controller of claim 4 wherein the second elongate member comprises a first surface disposed proximate the outer surface of the case and the second elongate member comprises a second surface opposing the first surface of the second elongate member, the second surface of the first elongate member being configured and arranged to be non-parallel with the second surface of the second elongate member.

6. The games controller of claim 4 wherein the first elongate member is disposed outermost.

7. The games controller of claim 4 wherein the first elongate member is disposed in closer proximity to a handle than a respective adjacent second elongate member.

8. The games controller of claim 4 wherein the first elongate member comprises a first side edge and a second side edge opposing the first side edge, the first side edge being disposed in closer proximity to a respective adjacent second elongate member than the second side edge, and the second side edge being disposed in closer proximity to a respective adjacent handle than the first side edge, and wherein the first side edge is disposed in closer proximity to a portion of the outer surface of the back of the case to which the first elongate member is mounted than the second side edge.

9. The games controller of claim 1 being a hand held controller for a games console and comprising a hard outer case, wherein the first elongate member is at least partially disposed in a respective channel formed in a rear surface of the case.

10. The games controller of claim 1 wherein the first elongate member is at least partially disposed in a respective channel formed in a rear surface of the case, the channel being configured and arranged to form a close fit to at least a portion of the first elongate member so as to provide lateral support thereto.

11. The games controller of claim 1 wherein the first elongate member comprises a first dimension and the case comprises a cover portion forming a conduit enclosing the first elongate member within the respective channel along a portion of the first dimension of the first elongate member.

12. The games controller of claim 1 wherein the first elongate member comprises a longitudinal dimension and the case comprises a cover portion forming a conduit enclosing the first elongate member within the respective channel along a portion of the longitudinal dimension of the first elongate member.

13. The games controller of claim 11 wherein the first elongate member comprises a first part of a complementary locking mechanism, and wherein the conduit comprises a second part of a complementary locking mechanism.

14. The games controller of claim 13 wherein the first part of a complementary locking mechanism is a selected one of i) a catch ii) a barb, and is displaceable so as to release the first elongate member from the conduit.

15. The games controller of claim 13 wherein the first part of a complementary locking mechanism is a selected one of i) an aperture and ii) a recess, and has an engaging edge.

16. The games controller of claim 13 wherein the second part of the complementary locking mechanism is a selected one of i) a catch and ii) a barb, and is displaceable so as to release the first elongate member from the conduit.

17. The games controller of claim 13 wherein the second part of the complementary locking mechanism is a selected one of i) an aperture and ii) a recess, and has an engaging edge.

18. The games controller of claim 1 wherein the first elongate member is formed from material having a thickness less than 5 mm.

19. The games controller of claim 1 wherein the first elongate member is formed from material having a thickness between 1 mm and 3 mm.

20. The games controller of claim 1 comprising two of the first elongate members, wherein the two first elongate members are parallel with respect to one another.

21. The games controller of claim 1 comprising two of the first elongate members, wherein the two first elongate members converge towards the front end of the case with respect to one another.

22. The games controller of claim 1 wherein a portion of the first elongate member is in registry with a switch mechanism disposed within the case, such that displacement of the first elongate member activates the switch mechanism.

23. The games controller of claim 1 wherein a switch mechanism is disposed between the first elongate member and an outer surface of the base of the case.

24. The games controller of claim 1 wherein a switch mechanism is mounted to a rear panel of the case wherein the switch mechanism comprises an engaging surface, the engaging surface being disposed in an aperture in an outer surface of the rear panel and arranged flush with the outer surface of the rear panel.

25. The games controller of claim 1 wherein a switch mechanism is mounted to a rear panel of the case wherein the switch mechanism comprises an engaging surface, the engaging surface being recessed within an aperture defined in an outer surface of the rear panel.

26. The games controller of claim 1 wherein the first additional control is a paddle lever.

27. The games controller of claim 1 wherein the first additional control is substantially vertically orientated with respect to the case.

28. The games controller of claim 1 wherein the first additional control is formed separately from the case.

29. The games controller of claim 1 wherein the first elongate member is inherently resilient and flexible so as to be sufficiently displaceable to active the control function.

30. A control actuator for use with a games controller comprising a case and a plurality of controls located on a front end and a top of case, the case being shaped to be held in both hands of a user such that the user's thumbs are positioned to operate controls located on the top of the case and the user's index fingers are positioned to operate controls located on the front end of the case, the control actuator being mountable on a base of the games controller in a position operable by a middle, ring or little finger of the user, the control actuator comprising:

an elongate member displaceable by the user to activate a control function, wherein the elongate member comprises a first surface for being disposed proximate an outer surface of the base of the games controller, and wherein the elongate member comprises a second surface opposing the first surface, the second surface being configured and arranged to be non-parallel with a portion of the outer surface of the base of the games controller adjacent to which the elongate member is to be mounted.

* * * * *